May 27, 1930.  R. E. JOYCE  1,760,067
PRESSURE RELIEF VALVE
Original Filed Sept. 2, 1927
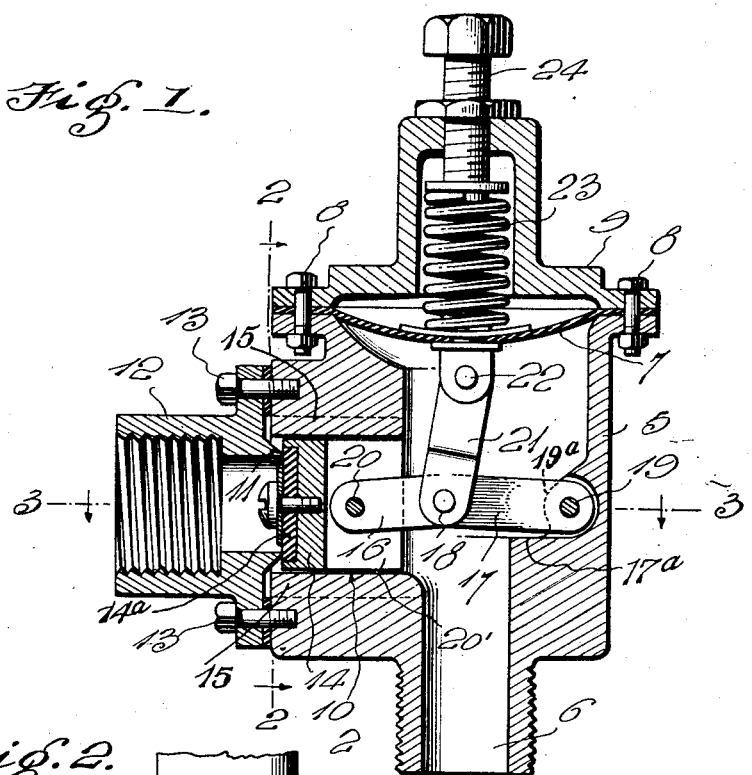
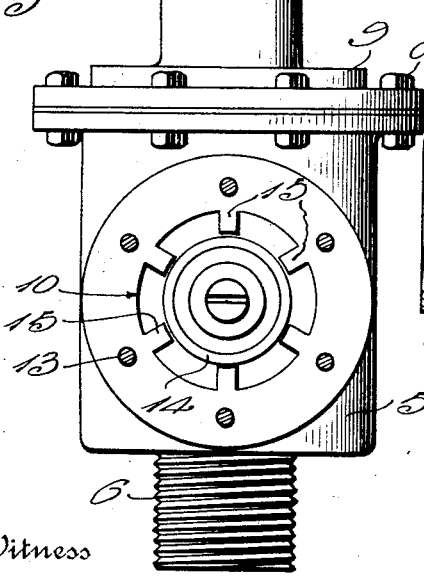
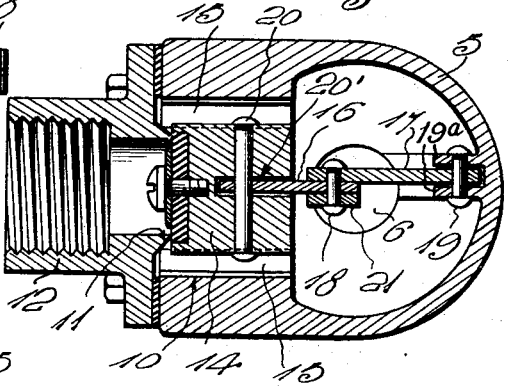
Inventor
R. E. Joyce Patented May 27, 1930

1,760,067

UNITED STATES PATENT OFFICE

ROY E. JOYCE, OF LOS ANGELES, CALIFORNIA

PRESSURE-RELIEF VALVE

Application filed September 2, 1927, Serial No. 217,203. Renewed March 22, 1930.

In pressure relief valves now in use, the customary spring or weight exerts a holding force on the valve equivalent only to the difference between the normal pressure held back by the valve and the pressure at which it opens. For instance, in a line to carry twenty-five pounds pressure, this pressure must not exceed twenty-eight pounds. Hence, the effective force of the spring or weight which holds the valve closed, is but three pounds and this is insufficient to hold the valve against leakage. My invention however, aims to provide a new and improved relief valve embodying efficient means for multiplying this effective force of the spring or weight so that while many times that force will be exerted to hold the valve closed, such force will be overcome by the same pressure increase which would now be relied upon to open the valve.

With the foregoing in view, the invention resides in the novel subject matter hereinafter described and claimed, the description being supplemented by the accompanying drawing.

Fig. 1 is a vertical sectional view of a relief valve constructed in accordance with my invention.

Fig. 2 is a vertical transverse sectional view on line 2—2 of Fig. 1.

Fig. 3 is a horizontal sectional view on line 3—3 of Fig. 1.

The drawings above briefly described, illustrate the preferred form of construction and while this construction will be herein specifically explained, it is to be understood that within the scope of the invention as claimed, variations may be made.

The numeral 5 on the drawing, denotes a valve casing having a pressure inlet 6 at any desired location. One side wall of the casing 5 is formed by a diaphragm 7 held in place by bolts 8 and a bonnet 9. 10 denotes a pressure outlet opening through the wall of the casing, the axis of this opening being at right angles to the axis of the diaphragm or movable wall 7. At the periphery of this opening, an inwardly or pressure facing seat 11 is provided, said seat being here shown as formed on a separate outlet connection 12 which is secured to the casing by cap screws or the like 13.

A valve 14 is slidably mounted in the opening 10 for co-action with the seat 11 and either the periphery of this valve or the wall of said opening, are longitudinally ribbed as at 15 to permit fluid to pass when the valve is open.

Two toggle links 16 and 17 are pivoted together at their inner ends as denoted at 18, the outer end of link 17 being pivoted at 19 to lugs 19ª integral with the portion of the casing 5 opposite the inner end of the valve 14, while the outer end of link 16 is pivoted at 20 in a kerf 20′ formed in said inner end of said valve. These links 16—17 converge toward the diaphragm 7 and are connected with the latter by an actuating link 21, one end of this link being pivoted to the links 16—17 by means of the pivot 18, while suitable pivot means 22 connects the other end of said actuating link with the diaphragm 7.

A coiled compression spring 23 is housed in the bonnet 9 and exerts inward pressure on the diaphragm 7 so as to hold the links 16—17—21, in valve-closed position as shown in Fig. 1. The strength of the spring 23 may be varied by means of an appropriate adjusting screw 24 and while the valve may be set to blow-off at any desired increase in pressure, the spring and the toggle links will nevertheless exert a force many times that which is ordinarily obtained in pressure relief valves for the purpose of holding the valve closed. A horizontal ledge 17ª is formed integrally with the casing 5 between the lugs 19ª and the opening 10. This ledge is in the downward path of link 17 and prevents this link and link 16 from moving downwardly past dead center, excessively compressing the soft valve face 14ª and then effecting opening of the valve at low pressure.

I claim:—

1. A pressure relief valve comprising an open-topped casing having a pressure inlet and a lateral pressure outlet, the latter having an inwardly facing valve seat and valve-guiding means, a valve slidably mounted in said guiding means and co-operating with said seat, two toggle links in the casing having their inner ends pivoted together, the outer end of one of said links being pivoted to said valve, the outer end of the other link being pivoted to the casing at a point horizontally spaced from the inner end of said valve, a horizontal ledge in the casing formed integrally with the latter in the downward path of said other link to limit the valve-closing movement of the two toggle links, a vertical link pivoted at its lower end to the inner ends of said toggle links, a diaphragm extending across the open top of the casing and having a lug pivoted to the upper end of said vertical link, a hood secured to the casing over said diaphragm, a coiled compression spring in said hood acting downwardly on said diaphragm, and an adjusting screw for said spring threaded through said hood.

2. A pressure relief valve comprising an open-topped casing having a pressure inlet at its lower end and a lateral pressure outlet, said outlet embodying an inner cylindrical longitudinally ribbed portion and an inwardly facing valve seat at the outer end of said cylindrical portion, a lug in said casing formed integrally therewith opposite said pressure outlet, a horizontal ledge in said casing formed integrally therewith between said lug and said pressure outlet, a cylindrical soft-faced valve slidable in said cylindrical portion of said pressure outlet in contact with the ribs thereof, said valve having a recess in its inner end, two toggle links in the casing pivoted together at their inner ends, the outer end of one of said toggle links being pivoted to said lug, the outer end of the other link being disposed in said recess of said valve and pivoted to the latter, a vertical link pivoted at its lower end to the inner ends of said toggle links, a diaphragm across the open top of the casing having a lug pivoted to the upper end of said vertical link, a hood secured to the casing over said diaphragm, a coiled compression spring in said hood acting downwardly on said diaphragm, and an adjusting screw for said spring threaded through said hood, the aforesaid ledge being disposed in the downward path of one of the toggle links to limit the valve-closing movement of said toggle links.

In testimony whereof I have hereunto affixed my signature.

ROY E. JOYCE.